(12) United States Patent
Batistic et al.

(10) Patent No.: US 7,322,660 B2
(45) Date of Patent: Jan. 29, 2008

(54) METHOD FOR ELECTRONICALLY REGULATING BRAKE-POWER DISTRIBUTION

(75) Inventors: Ivica Batistic, Frankfurt (DE); Holger Schmidt, Wattenberg (DE)

(73) Assignee: Continental Teves AG & Co. OhG, Frankfurt (DE)

( * ) Notice: Subject to any disclaimer, the term of this patent is extended or adjusted under 35 U.S.C. 154(b) by 177 days.

(21) Appl. No.: 10/526,661

(22) PCT Filed: Sep. 4, 2003

(86) PCT No.: PCT/EP03/09792

§ 371 (c)(1),
(2), (4) Date: Mar. 4, 2005

(87) PCT Pub. No.: WO2004/022396

PCT Pub. Date: Mar. 18, 2004

(65) Prior Publication Data

US 2005/0242662 A1 Nov. 3, 2005

(30) Foreign Application Priority Data

Sep. 6, 2002 (DE) .............................. 102 41 910
Nov. 11, 2002 (DE) .............................. 102 52 232

(51) Int. Cl.
*B60T 8/62* (2006.01)
(52) U.S. Cl. ...................... 303/186; 303/121; 303/150; 303/163; 303/166; 303/167
(58) Field of Classification Search ................ 303/186, 303/121, 138, 147–150, 163, 165, 166, 167, 303/168, 176
See application file for complete search history.

(56) References Cited

U.S. PATENT DOCUMENTS

| 4,632,467 | A | * | 12/1986 | Kircher et al. .............. 303/187 |
| 4,826,257 | A | | 5/1989 | Burckhardt et al. |
| 5,150,950 | A | * | 9/1992 | Arikawa et al. ............ 303/186 |
| 5,454,630 | A | * | 10/1995 | Zhang ........................ 303/175 |
| 5,632,535 | A | * | 5/1997 | Luckevich et al. ......... 303/186 |
| 5,646,849 | A | * | 7/1997 | Walenty et al. ............... 701/70 |
| 5,887,957 | A | | 3/1999 | Büttner et al. |
| 6,206,488 | B1 | | 3/2001 | Binder et al. |

FOREIGN PATENT DOCUMENTS

| DE | 38 29 951 A1 | 3/1990 |
| DE | 40 07 360 A1 | 9/1991 |
| DE | 198 82 150 T1 | 1/2000 |
| DE | 198 59 964 A1 | 9/2000 |
| DE | 101 54 425 A1 | 5/2003 |
| WO | WO-98/39187 A1 * | 9/1998 |

* cited by examiner

*Primary Examiner*—Pam Rodriguez
(74) *Attorney, Agent, or Firm*—RatnerPrestia

(57) ABSTRACT

A method for electronically regulating brake force distribution to the front axle and the rear axle of a motor vehicle (EBV control), wherein the rotational behavior of the vehicle wheels is determined, compared with the vehicle speed or vehicle reference speed and/or with the changes of these variables, and evaluated to limit the slip on the rear-wheel brakes by modulating the braking pressure. The brake force distribution is controlled in dependence on the sum signals obtained by addition of acceleration values determined on each individual rear wheel and/or by addition of slip values determined on each individual rear wheel. It is particularly arranged for to weight the sum signals with variable sum factors and evaluate them as a criterion for triggering the EBV control (so-called EBV plus control).

6 Claims, 2 Drawing Sheets

| Line | Sum_factor$_{DVN}$ | Sum_factor$_\lambda$ | |
|---|---|---|---|
| 1 | 1,0 | 1,1 | |
| 2 | 1,1 | 1,0 | |
| 3 | 1,2 | 0,8 | |
| 4 | 1,35 | 0,6 | |
| n | 1,45 | 0,0 | (condition is void) |

Fig. 1:  Tabular Representation of the Variable Sum Factors

METHOD FOR ELECTRONICALLY REGULATING BRAKE-POWER DISTRIBUTION

TECHNICAL FIELD

The present invention relates to a method for electronically regulating brake force distribution to the front axle and the rear axle of a motor vehicle, wherein the rotational behavior of the vehicle wheels is determined, compared with the vehicle speed or vehicle reference speed and/or the changes of these variables, and evaluated to limit the slip on the rear-wheel brakes by modulating the braking pressure.

BACKGROUND OF THE INVENTION

When rating the service brake system of a motor vehicle, it is important to dimension the brake force component of the rear axle by various measures in such a manner that the rear axle will principally block later than the front axle up to a braking pressure that corresponds to a longitudinal deceleration of roughly 0.8 g. Only in the presence of a longitudinal deceleration still greater than 0.8 g or a corresponding braking pressure is it allowable that the wheels of the rear axle lock before the wheels of the front axle.

Mechanical/hydraulic pressure controllers (load-responsive controllers or controllers with a fixed change-over point) on the rear axle that were used for brake force reduction had to satisfy this demand until the introduction of anti-lock control systems (ABS).

A few years ago, a control function has been developed and introduced, above all in front-wheel driven small vehicles having an unfavorable weight distribution (much load on the front axle, little load on the rear axle), which obviated the need for hydraulic/mechanical measures to reduce the brake force component of the rear axle. This control function allowed replacing the various hydraulic/mechanical brake force controllers. The name given to this control function was 'EBV control' (electronic control of brake force distribution).

In a braking operation, the EBV system shuts off the rear axle (under certain circumstances, also one single rear wheel) due to the slip on at least one rear wheel from further pressure build-up by activating the inlet valves. Instead of the slip signal, various other signals, such as signals of longitudinal or transverse acceleration or derivatives and linkages thereof can be evaluated for this purpose. The rear-wheel brakes are not isolated completely from further pressure build-up, rather, a controlled pressure build-up with an extremely low gradient is permitted.

When an EBV control operation commences, further pressure build-up on the rear axle is initially prevented. The pressure can be cautiously increased at a later point of time after slip has been reduced. This arrangement develops an independent control ensuring the brake force distribution between the front axle and the rear axle without additional mechanical/hydraulic elements.

However, it cannot be ruled out that EBV control is triggered already when a harmless road irregularity or a small area of a different coefficient of friction at a relatively low braking pressure occurs, where a limitation of the brake force on the rear axle is not appropriate. When the driver is now confronted with an emergency situation demanding a maximum deceleration, i.e. a maximum utilization of the coefficient of friction on both axles, the brake force component of the rear axle can be made use of only more or less delayed.

The EBV control measures known in the art principally suffer from the following disadvantages:

The braking power of the vehicle at a rapid increase of the initial pressure is impaired because the vehicle is generally slowed down until standstill before the rear axle reaches the full rate of utilization of its braking potential;

The insufficient utilization of the braking potential of the rear axle causes increased pad wear at the front axle.

Determining the proper point of time of the entry into EBV control represents a major problem. If EBV control is triggered as a result of a disturbance, this can eventually cause a significantly longer stopping distance.

BRIEF SUMMARY OF THE INVENTION

In view of the above, an object of the invention is to overcome the above-mentioned drawbacks of the prior-art EBV controls and to disclose a method achieving a higher rate of utilization of the braking power of the rear wheels without any loss in stability.

It has been found out that this object can be achieved by a method for electronically regulating brake force distribution wherein the brake force distribution is controlled in dependence on sum signals obtained by addition of acceleration values determined on each individual rear wheel and/or slip values determined on each individual rear wheel.

Expediently, a quantity (DVN) obtained by integration of the wheel acceleration is used as an acceleration value.

According to an embodiment of the invention, the acceleration sum signals and the slip sum signals are respectively compared with predetermined acceleration or slip thresholds that correspond to the detection thresholds or control entry thresholds of an anti-lock control system (ABS control). The EBV control is triggered when these thresholds are exceeded.

Another type of embodiment of the method of the invention involves that the acceleration sum signals and slip sum signals are respectively multiplied and weighted by a variable sum factor, i.e. by an acceleration sum factor or a slip sum factor, respectively. It has proved advantageous in this respect to produce the sum of the acceleration sum signal weighted with the variable acceleration sum factor and the slip sum signal weighted with the variable slip sum factor and to evaluate said sum as a criterion for initiating the EBV control.

The sum factors are varied in such a fashion that, according to tendency, at a high achievement rate, i.e. a relatively high value of the weighted acceleration sum signal or the weighted slip sum signal, already a lower value of the second component, i.e. the slip sum signal or the acceleration sum signal, respectively, causes initiation of the EBV control.

This is achieved in that for determining the entry of the EBV control, the acceleration sum signal and the slip sum signal are successively weighted with variable acceleration sum factors or slip sum factors, respectively, the values thereof being predetermined.

BRIEF DESCRIPTION OF THE DRAWINGS

FIG. 1 is a chart for illustrating the allocation of the variable sum factors of the invention.

DETAILED DESCRIPTION OF THE PREFERRED EMBODIMENTS

Figure 2:
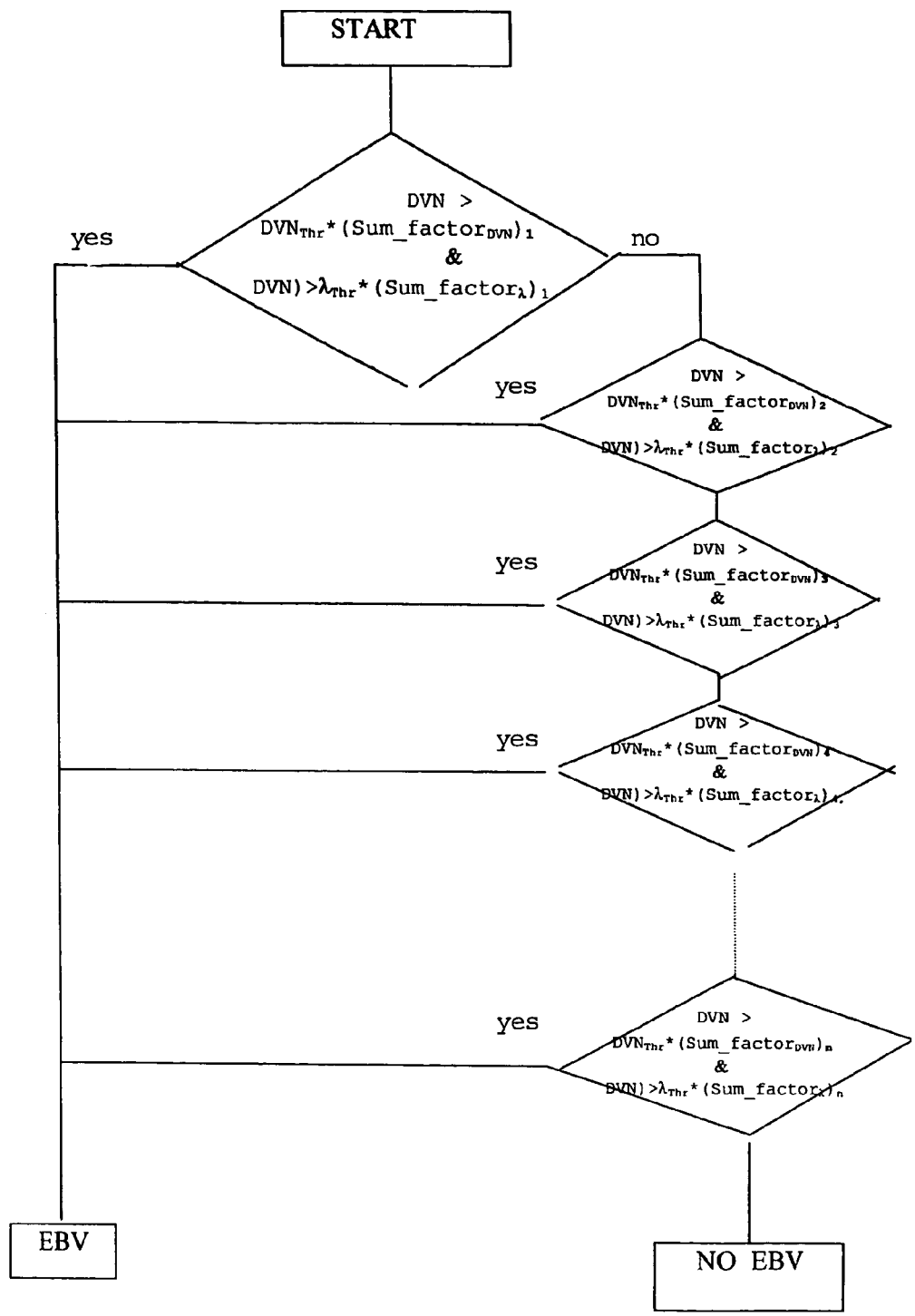
FIG. 2 is a flow chart showing a successive interrogation for determining the variable sum factors.

The invention is based on the knowledge that the possibilities which an electronic control system such as ABS, ESP, etc. offers can be used to decisively improve EBV control.

According to the invention, the rotational behavior of the rear wheels is individually monitored for determining the acceleration and the wheel slip and evaluated to produce sum signals, which will then define the entry into the EBV control. The sum signals are compared with acceleration and slip thresholds, weighted by variable sum factors and finally evaluated to determine the EBV control intervention.

The problem of the premature initiation is hence counteracted by way of the method covering both rear wheels and being described in the following. Said method is based on the following reflections:

When looking at both rear wheels of a motor vehicle as one wheel by way of summation of the relevant ABS signals, this will open up new perspectives that allow shifting the compromise between vehicle deceleration and wheel stability in favor of the deceleration without having to fear loss in stability. This applies above all to braking operations under inhomogeneous roadway conditions, such as bumpy roadways, slopes, etc. The described risk of a premature EBV control commencing at a far too low pressure level is significantly reduced. The requirements of maximum deceleration are complied without any appreciable time delay.

This is the essential subject matter of the invention. A control according to the method of the invention will be referred to as 'EBV plus' in the following. 'EBV plus' ensures that the control activity at the rear axle will commence significantly later than in a conventional EBV control, however, significantly earlier than in a prior-art ABS control rated with respect to the maximum of the μ-slip curve.

The EBV plus control of the invention commences as soon as the sum signals exceed the detection thresholds. As this occurs, the EBV plus sum detection thresholds are always higher than the ABS detection thresholds on each individual wheel so that both rear wheels are forced to participate in the detection of the EBV plus control.

According to the invention, the ABS-relevant signals (slip and acceleration or a signal like DVN produced from the acceleration) of the rear axle are added. Beside the acceleration of both rear wheels, the differences can be added to the acceleration signals of the respective equal-sided front wheels. The acceleration signals or signals (DVN, Δa) connected thereto are referred to by 'a', while the slip signals are designated by 'λ'.

The respective sums are compared with the ABS detection thresholds:

$$[(a_{HL}+a_{HR})>a_{Thr}*\text{Sum\_factor}_a] \& [(\lambda_{HL}+\lambda_{HR})> \lambda_{Thr}*\text{Sum\_factor}_\lambda] \qquad (1)$$

The two sum factors, i.e. the acceleration sum factor 'Sum_factor$_{DVN}$' and the slip sum factor 'Sum_factorλ', are configured as variable quantities. A higher achievement rate of the acceleration threshold '$a_{Thr}$' reduces the requirement with respect to the level of the achievement rate of the slip threshold '$\lambda_{Thr}$'.

The two quantities are so chosen that with an instability prevailing on one side the individual ABS detection threshold always responds before the sum conditions.

The following statements refer to a special embodiment of the invention:

The sum signals for the slip and for the acceleration integral are produced according to the relation $$\lambda_{HA}=\lambda_{HL}+\lambda_{HR} \text{ and}$$

$$DVN_{HA}=DVN_{HL}+DVN_{HR}$$

(HA designates the rear axle, with HL designating the rear left wheel and HR designating the rear right wheel). As is known, the slip is defined as the vehicle reference speed minus the vehicle wheel speed ($V_{REF}-V_{WHEEL}$); 'DVN' is the integral of the wheel acceleration or wheel deceleration.

The sum signals are compared with the slip threshold and the DVN threshold:

$$[(DVN_{HA})>DVN_{Thr}*\text{Sum\_factor}_{DVN}] \& [(\lambda_{HL}+\lambda_{HR})> \lambda_{Thr}*\text{Sum\_factor}_\lambda] \qquad (2)$$

The illustration in tabular form according to FIG. 1 depicts the variableness of these sum factors.

The flow chart of an interrogation cycle shown in FIG. 2 permits recognizing the linkage of the variable sum factors according to the embodiment of the invention described in FIG. 1.

After the "START" of the interrogation (see FIG. 2), a check is made whether the condition $$[(DVN_{HA})>DVN_{Thr}*\text{Sum\_(factor}_{DVN})_1] \& [(\lambda_{HL}+ \lambda_{HR})> \lambda_{Thr}*(\text{Sum\_factor}_\lambda)_1],$$

is satisfied, the basis being sum factors having the values in line 1 of the table according to FIG. 1. If this condition is not satisfied, an interrogation will follow on the basis of the sum factors '2', that means the values in line 2 of the table according to FIG. 1, etc.

Once initiated, the EBV plus control will be executed according to the same criteria as a normal ABS control. In this system, too, it is obviated to switch on the return pump for comfort reasons.

Technical advantages of the method of the invention ('EBV plus') over conventional EBV systems are, among others, the following:

- A high rate of insusceptibility with respect to disturbances, with the result of a response of the control in conformity with requirements;
- A considerably later commencement and quicker start of the control activity ensures an optimal utilization of the coefficient of friction available, even if the driver's specifications change due to a sudden rise in the initial pressure; a short stopping distance is achieved in every situation;
- uniform wear of the brake pads of both axles;
- there is no need for additional sensors to achieve the minimum deceleration mandated by law upon circuit failure, because the control takes place in the range of the $\mu_{MAX}$.

Another major issue of the invention is:

Due to the summation of all relevant control signals of both rear wheels, the braking pressure in the brakes of the two rear wheels is controlled close to the maximum coefficient of friction $\mu_{MAX}$ for the given combination of tires/roadway, however, on the stable branch of the μ-slip curve. This will safeguard both a high degree of vehicle stability and an optimal braking force.

Irrespective of whether the driver maintains or increases the initial pressure in this condition, the controlled pressure decrease at the rear axle will cause a braking pressure to develop where the two rear wheels are led very closely to the achievable maximum of the braking force for the given friction value.

When the initial pressure is increased by the driver, further increase of the braking force at the rear axle is possible only in a very narrow slip range, to be specific, until $\mu_{MAX}$ is reached, or until ABS control commences at the rear axle. There is a smooth change from the EBV plus control to the ABS control in the case of increase of the initial pressure, because a very narrow slip range is concerned.

When the initial pressure depending on the pedal application is maintained constant, the EBV plus control is terminated after a defined time, meaning in the present example after roughly 300 to 500 ms of the pulsed pressure increase with the valve connection, and a permanent pressure increase is enabled. This will ensure that an EBV plus control that might have been triggered by a road irregularity is terminated quickly.

The invention claimed is:

1. A method for electronically regulating brake force distribution to the front axle and the rear axle of a motor vehicle, wherein the rotational behavior of the vehicle wheels is determined, compared with the vehicle speed, the vehicle reference speed, the changes of these variables, or a combination thereof, and evaluated to limit the slip on the rear-wheel brakes by modulating the braking pressure,
   wherein the brake force distribution is controlled in dependence on sum signals obtained by addition of acceleration values determined on each individual rear wheel and slip values determined on each individual rear wheel,
   wherein the acceleration sum signals and slip sum signals are respectively multiplied and weighted by a variable acceleration sum factor and a variable slip sum factor, respectively, and a sum is produced of the acceleration sum signals weighted with the variable acceleration sum factor and of the slip sum signals weighted with the variable slip sum factor and is evaluated as a criterion for initiating the electronically regulated control, and
   wherein, according to tendency, at a relatively high value of a weighted acceleration sum signal, already a lower value of the slip sum signals causes initiation of the electronically regulated control.

2. The method as claimed in claim 1,
   wherein a quantity obtained by integration of the wheel acceleration on each individual wheel is used as an acceleration value.

3. The method as claimed in claim 1,
   wherein the acceleration sum signals are compared with predetermined acceleration thresholds and the slip sum signals are compared with slip said predetermined acceleration and slip thresholds, and wherein the electronically regulated control is triggered when these said thresholds are exceeded.

4. The method as claimed in claim 1,
   wherein for determining an entry of the electronically regulated control, the acceleration sum signals and the slip sum signals are successively weighted with the variable acceleration sum factors or slip sum factors, respectively, the values thereof being predetermined.

5. A method for electronically regulating brake force distribution to the front axle and the rear axle of a motor vehicle, wherein the rotational behavior of the vehicle wheels is determined, compared with the vehicle speed, the vehicle reference speed, the changes of these variables, or a combination thereof, and evaluated to limit the slip on the rear-wheel brakes by modulating the braking pressure,
   wherein the brake force distribution is controlled in dependence on sum signals obtained by addition of acceleration values determined on each individual rear wheel and slip values determined on each individual rear wheel,
   wherein the acceleration sum signals and slip sum signals are respectively multiplied and weighted by a variable acceleration sum factor and a variable slip sum factor, respectively, and a sum is produced of the acceleration sum signals weighted with the variable acceleration sum factor and of the slip sum signals weighted with the variable slip sum factor and is evaluated as a criterion for initiating the electronically regulated control, and
   wherein, according to tendency, at a relatively high value of a weighted slip sum signal, already a lower value of the acceleration sum signals causes initiation of the electronically regulated control.

6. The method as claimed in claim 5,
   wherein for determining an entry of the electronically regulated control, the acceleration sum signals and the slip sum signals are successively weighted with the variable acceleration sum factors or slip sum factors, respectively, the values thereof being predetermined.

* * * * *